(12) United States Patent
McKay et al.

(10) Patent No.: US 8,997,248 B1
(45) Date of Patent: Mar. 31, 2015

(54) SECURING DATA

(71) Applicant: USAA, San Antonio, TX (US)

(72) Inventors: Joel Andrew McKay, San Antonio, TX (US); David South, San Antonio, TX (US); Robert Aaron Ghavidel, Mico, TX (US); Donald Nathaniel Holloway, III, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 14/245,198

(22) Filed: Apr. 4, 2014

(51) Int. Cl.
*G06F 21/00* (2013.01)
*H04L 29/06* (2006.01)

(52) U.S. Cl.
CPC .................................. *H04L 63/0428* (2013.01)
USPC .......................................................... 726/27

(58) Field of Classification Search
None
See application file for complete search history.

(56) References Cited

U.S. PATENT DOCUMENTS

| | | | |
|---|---|---|---|
| 2010/0218037 A1* | 8/2010 | Swartz et al. | 714/6 |
| 2011/0137925 A1* | 6/2011 | Baird et al. | 707/758 |
| 2013/0124523 A1* | 5/2013 | Rogers et al. | 707/737 |
| 2013/0291118 A1* | 10/2013 | Li et al. | 726/26 |
| 2014/0101714 A1* | 4/2014 | Kundu et al. | 726/1 |

\* cited by examiner

*Primary Examiner* — William Goodchild
(74) *Attorney, Agent, or Firm* — Fish & Richardson P.C.

(57) ABSTRACT

Methods, systems, and apparatus, including computer programs encoded on computer storage media, for securing data. One of the methods includes receiving, by the map reduce framework, data for analysis. The method includes identifying, by the map reduce framework, private data in received data. The method includes encrypting the private data. The method includes storing the encrypted private data in a location separate from the received data. The method includes obfuscating the private data by adding a reference to the location of the encrypted private data in the received data.

21 Claims, 10 Drawing Sheets

US 8,997,248 B1

SECURING DATA

BACKGROUND

Data warehouses store information from a variety of data sources. A data warehouse can store current or historical data. Data in the data warehouse can be analyzed to determine a wide variety of different types of information.

Map Reduce is programming model for processing data in parallel. Map Reduce allows for distributed processing of the map and reduction operations. Provided that each mapping operation is independent of the others, all maps can be performed in parallel—though in practice this is limited by the number of independent data sources and/or the number of CPUs near each source.

SUMMARY

In general, one innovative aspect of the subject matter described in this specification can be embodied in methods that include the actions of receiving, by the map reduce framework, data for analysis. The method includes the actions of identifying, by the map reduce framework, private data in received data. The method includes the actions of encrypting the private data. The method includes the actions of storing the encrypted private data in a location separate from the received data. The method also includes the actions of obfuscating the private data by adding a reference to the location of the encrypted private data in the received data.

Other embodiments of this aspect include corresponding computer systems, apparatus, and computer programs recorded on one or more computer storage devices, each configured to perform the actions of the methods. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The foregoing and other embodiments can each optionally include one or more of the following features, alone or in combination. Identifying the private data may include using a regular expression to identify candidate private data and confirming the candidate private data by performing a secondary validation of the candidate private data. The methods may include the actions of generating a hash-based message authentication code using the private data. Adding the reference to the location of the encrypted private data may include generating a tag, the tag including an indicator of the type of the private data and the hash-based message authentication code, and replacing the private data in the received data with the tag. The methods may include the actions of receiving, from a user, a request for stored private data, the request including a reference, verifying that the user is authorized to obtain the stored private data, obtaining the stored private data based on the reference, decrypting the stored private data, and providing the stored private data to the user. The methods may include the actions of receiving, from a user, a data, the data including a plurality of references to private data, and for each reference in the plurality of references, processing the reference. Processing the reference may include obtaining the stored private data based on the reference, verifying that the user is authorized to obtain the stored private data, and in response to determining the user is authorized, decrypting the stored private data and updating the data to include the stored private data. The user may be authorized to obtain stored data for at least one reference in the plurality of references.

BRIEF DESCRIPTION OF THE DRAWINGS

Like reference numbers and designations in the various drawings indicate like elements.

DETAILED DESCRIPTION

Data warehouses are collections of data that can be used for analysis by a wide variety of different users. For example, the data can be analyzed to improve marketing strategy, to determine business trends, and/or to detect fraud or other legal or regulatory violations. Because the data in the data warehouse can be accessed by multiple different users, some datawarehouses set permissions or otherwise restrict access to the data.

As data is imported into the data warehouse, private information can be identified and stored separately from the imported data allowing for role based security. A locator can be inserted into the data allowing the private information to be later accessed by users having permission to view the data.

Private data may also be identified and removed from other data sources, for example, private data may be identified and removed from a social media feed on a social networking site, for example LINKEDIN, FACEBOOK, or TWITTER.

Figure 1:
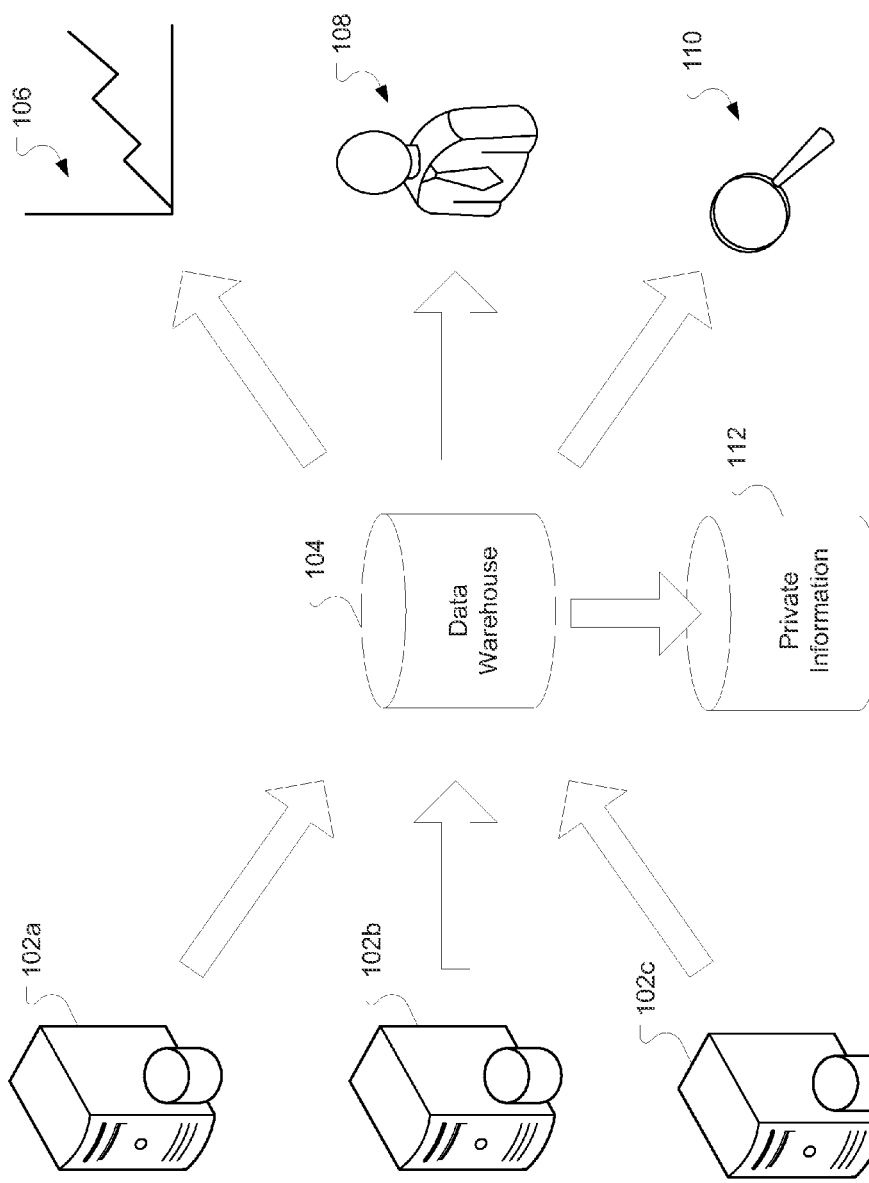
FIG. 1 illustrates an example of the consolidation and access of data in a data warehouse.

FIG. 1 illustrates an example of the consolidation and distribution of data. A data warehouse 104 or a big data system, can receive data from a variety of different data sources 102a, 102b, 102c. In general, big data is a term for large and complex data sets. Big data processing can include the capture, creation, storage, search, sharing, transfer, and analysis of the large and complex data sets. Data warehouses serve as one place where the data can be collected and analyzed. The data warehouse may include private data that has varying degrees of sensitivity. For example, private data can include identification information that can be used to identify or contact a person, health records, financial records, biological information, residential information, and demographic information. Some of the information may be private based on regulatory requirements (for example the Health Insurance Portability and Accountability Act of 1996 (HIPAA)), other information may be private based on the preference of members or other business concerns. In general, the data warehouse 104 may include security measures to protect all of the information stored in the data warehouse 104. However, private data private data may be provided an additional level of protection as described below.

Different users or types of users may access data in the data warehouse 104 for different reasons. For example, the data may be accessed to assist in the generation of a marketing campaign 106, as part of an executive report or business analysis process 108, the data may also be accessed and used in fraud detection 110 or other investigative process. Each type of user (the marketing user, the business user, and the investigative user) may need to be able to view different types of private data. For example, the marketing user may require access to demographic information but may not require detailed information about individual transactions or government identification information. The business user may require access to detailed information about individual transactions but may not need demographic or government identification information. The investigative user may require access to all these types of information.

Data that is provided with additional protection can be stored in one or more private information data stores 112 separately from the data warehouse 104. The private information data store 112 can be physically separate from the data warehouse 104 or can be logically separated and stored within the data warehouse 104. The data stores can be, for example, a relational on non-relational database.

Figure 2:
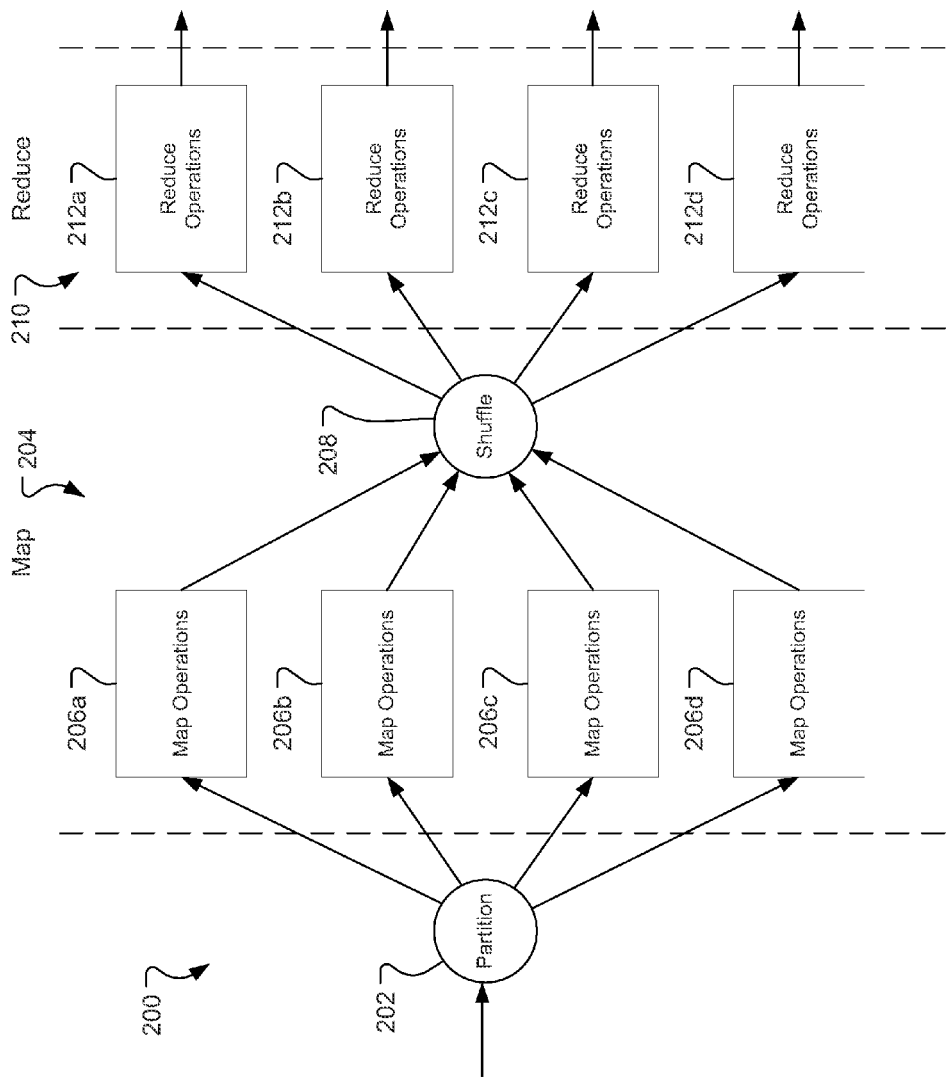
FIG. 2 illustrates an example of a map reduce application for processing data.

FIG. 2 illustrates a logical view of a map reduce application 100 for processing data. Map Reduce is programming model for processing data in parallel. Generally Map Reduce processing involves breaking computations down into map operations and reduce operations. The map operation performs an operation on each of the records. A shuffle operation groups all of the values with the same key. The reduce operation performs an operation on the values that share the same key to combine the values in some manner.

The process may be performed in parallel by a large number of computing systems, referred to as a cluster. Client computers provide data to the cluster. Master node computers oversee the storing of data in a distributed file system, such as the Hadoop Distributed File System, and the parallel execution of map and reduce operations. Slave nodes perform the map and reduce computations of the data provided by the clients.

Data received by the application 200 is partitioned 202 among different map operations 204a-d. The data may be stored in a Hadoop Distributed File System (HDFS). The data may be broken down into smaller chunks or blocks and distributed throughout the map operations. For example, 100 gigabytes of data may be broken into 1 gigabyte chunks.

During the map phase, map operator 206a-d can be performed on the data. In general, each of the map operations 206a-d perform similar operations on different portions or chunks of the input data to produce intermediate data. The map phase can produce output records in the form of key-value pairs. The output record generally includes one key that acts as a primary key to identify the output record. Generally, the key in the key value pair acts as a primary key that is used to combine and consolidate records in the reduce phase.

In a shuffle phase, the data from the map operations may be sorted and repartitioned 208 to prepare for the reduce phase. The shuffle phase takes the key-value pairs produced by the map operations 206a-d and groups together all the key-value pairs with the same key. The shuffle phase then outputs each distinct key and all the values with that key to the reduce operations 212a-d.

During the reduce phase 210, data from the shuffle operation 208 are combined and consolidated. Output records produced from the reduce phase may be stored or processed by subsequent map phases.

Figure 3:
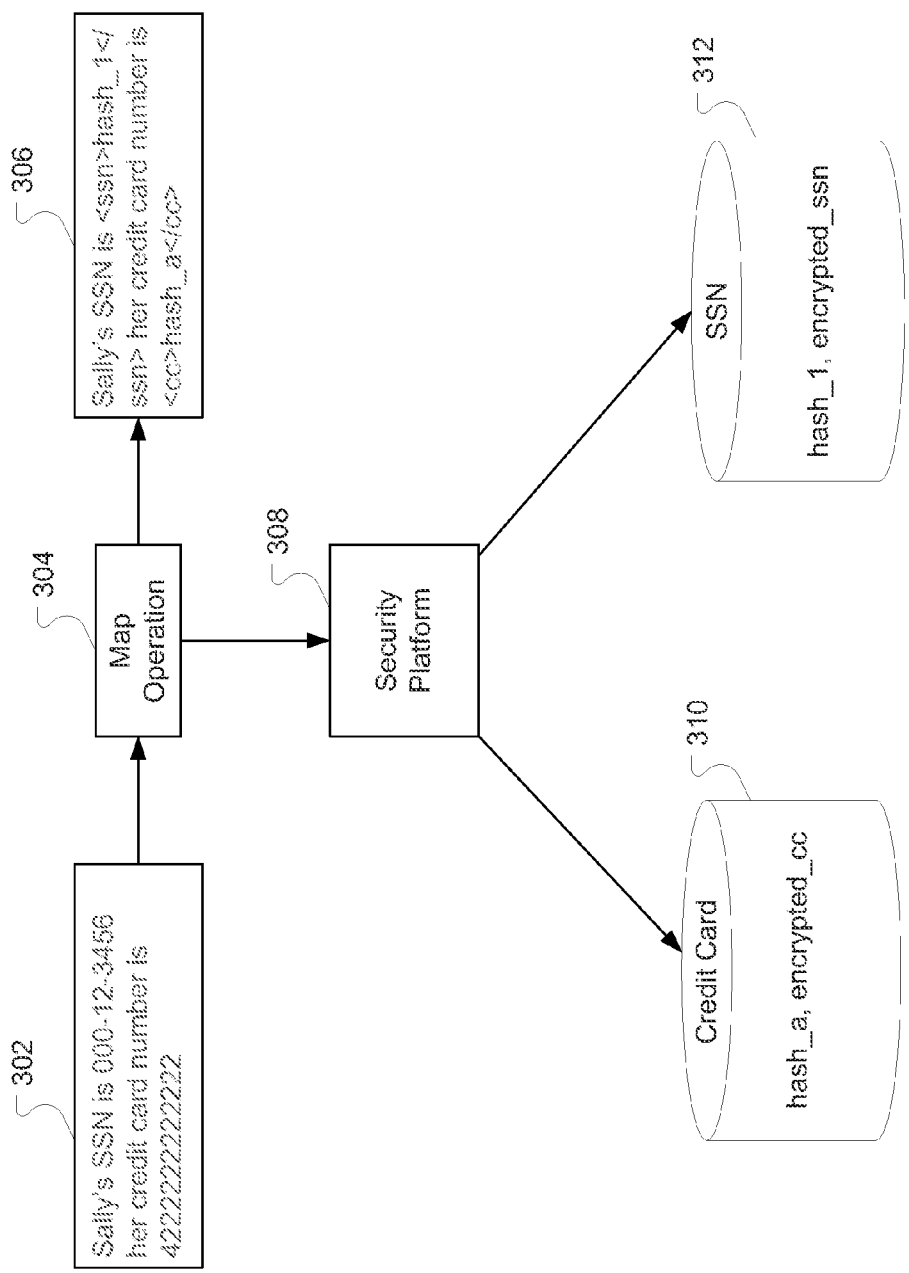
FIG. 3 illustrates an example of securing private data using a map operation.

FIG. 3 illustrates an example of securing data using a map operation. A data record 302 may be provided to a map operation 304. In this example, the data record indicates the social security number and credit card number of "Sally."

The map operation 304 can examine the data record 302 to identify potential private information. For example, if the data record 302 is structured data, that is, data including both fields and values, the map operation may have an identified list of fields that include private data.

The map operation 304 may also identify private data by processing the data record 302 to identify patterns in the strings. The patterns being associated with private data. In some implementations, the map operation 304 may perform one or more regular expression operations on the data record 302. In general, a regular expression is a sequence of characters that form a search pattern. Regular expression processors can accept data and a regular expression and identify strings or substrings of the data that match the regular expression. For example, the map operation 302 process the data record 302 by providing the regular expression "^4[0-9]{12}(?:[0-9]{3})?$" (associated with credit card numbers associated with the VISA credit cards) and the data record 302 to a regular expression processor. The regular expression process then identifies the content "4222222222222" as a potentially private data. Similarly, the pattern "^(\d{3}-?\d{2}-?\d{4}|XXX-XX-XXXX)$" can be used to identify a social security number. Other patterns can be created to identify different types of private data.

The map operation 304 may perform validation tests to increase the likelihood that the potentially private data is private data, and thereby reduce the possibility of false positives. For example, the map operation 304 by perform a validation test that includes a checksum of the potential private data "4222222222222" to determine if the number is actually a potential credit card number. In some implementations, no additional validation test may be performed.

If the potential private data passes the validation test, the private data (here, the credit card number "4222222222222") is provided to a security platform 308. The security platform encrypts the private data. For example, the security platform may encrypt the private data using a cryptographic key and any cryptographic algorithm, for example, AES-256. The security platform may also generate a message authentication code. A message authentication code is a code that can be used to verify and authenticate the data. For example, the security platform may generate a keyed-hash message authentication code (HMAC) for the data. A HMAC is a message authentication code involving a cryptographic hash function in combination with a secret cryptographic key. For the purposes of discussion, the examples will be described as using a HMAC; however, other message authentication codes could be used. Any cryptographic hash function can be used, for example, an MD5 hash, SHA-1, SHA-256, or any other conventional hashing algorithm.

In some implementations, data for each type of private data, for example, the social security number and the credit card number, is encrypted using a separate cryptographic key.

The security platform 308 can store the encrypted credit card number and the HMAC in a data store 310. For example, the encrypted credit card number and HMAC may be stored in a relational database or in non-relational database optimized for managing large data sets, such as APACHE HBASE. One advantage of HMACs is that they are less likely to suffer collisions than their underlying hash algorithm, that is the probability that an HMAC that is generated for a first piece of data using, for example, an MD5 hashing algorithm will be the same as an HMAC that is generated for a second piece of data, using the same MD5 hashing algorithm is less than the probability that the MD5 hash of the first piece of data will be the same as the MD5 hash of the second piece of data, as such the HMAC may be identified as a key that is used to identify the record including the HMAC and the encrypted private data.

In a similar fashion, the map operation 304 may identify the social security number "000-21-3456" as private data. The social security number is encrypted, a HMAC is generated, and the HMAC and encrypted social security number are stored in a data store 312.

The security platform 308 provides the HMAC 306 to the map operation 304. The map operation replaces the private data with a set of tags enclosing the HMAC in a tagged record 306. In this example, the credit card number is replaced with the "<cc>" tag (<cc> and the social security number is replaced with the "<ssn>" tag. During later processing, the HMAC may be extracted from the tagged record and used by the system to later retrieve the encrypted private data.

The map operation can be designed for extensibility. For example, the map operation may load a list of private data from a data store. Adding a new type of private data may include defining a tag, a regular expression, and an optional validation method. For example, the map operations may be provided a list of object-oriented objects (such as JAVA objects). Each object-oriented code may implement a standard interface that includes a method which provides a tag, a regular expression pattern and a method that provides further validation an data that matches the regular expression pattern.

Figure 4:
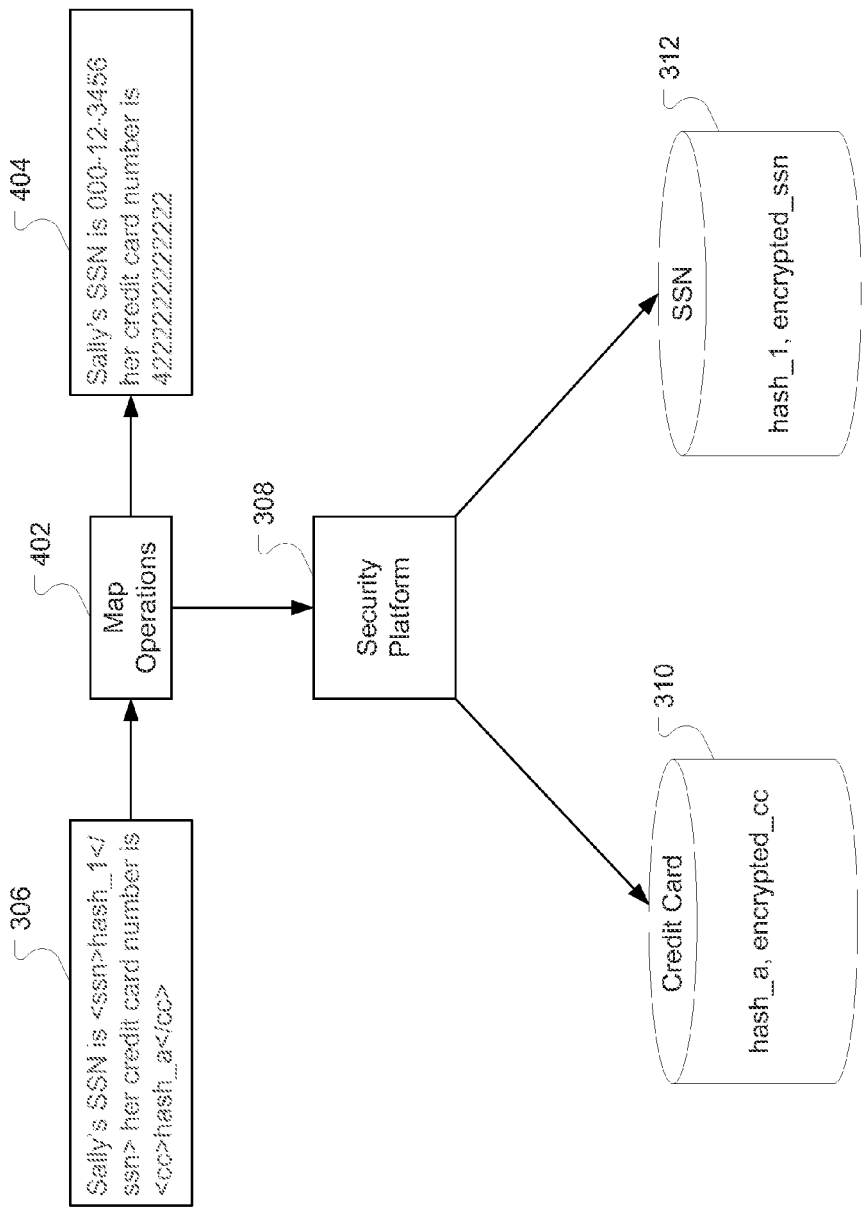
FIG. 4 illustrates an example of accessing private data using a map operation.

FIG. 4 illustrates an example of accessing secured data using a map operation. The tagged record 306 is provided to a map operation 402. This map operation 402 identifies the tags in the record. In this example, the map operation 402 detects the <ssn> tag and the <cc> tag. The map operation 402 provides each of the tags and the HMAC associated each of the tags to the security platform 308.

The security platform 308 uses the tags to identify which data store contains the relevant data. The security platform 308 uses the HMAC to identify the data record that includes the relevant data. Then the security platform 308 decrypts the encrypted data using a cryptographic key. The security platform 308 provides the decrypted data to the map operation 402. In some implementations, the security platform may verify the integrity of the decrypted data using the HMAC before passing the data back to the map operation 402.

The map operation 402 replaces the tags with the values provided by the security platform 308 to produce the output data record 404.

Figure 5:
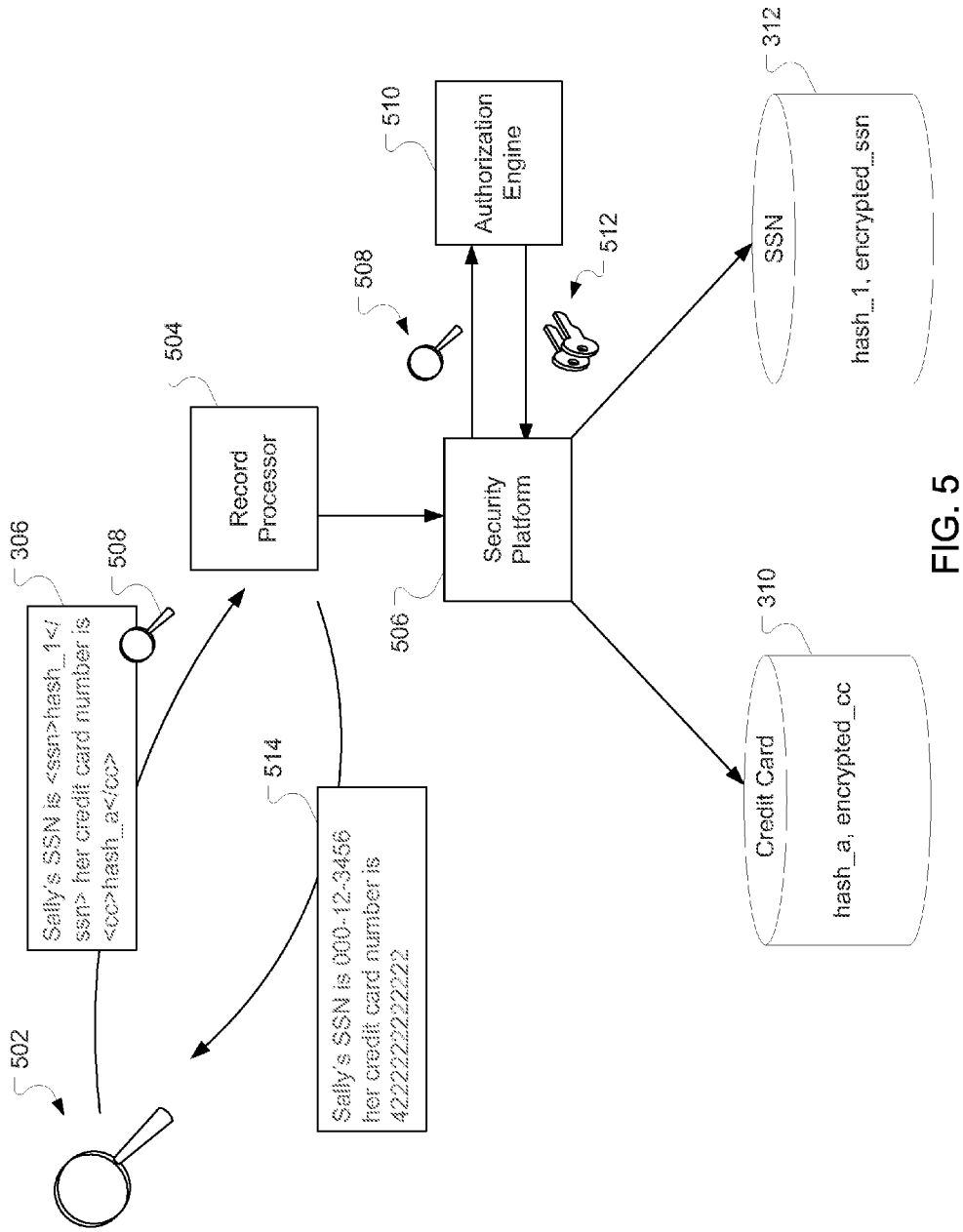
FIGS. 5-6 illustrate an example of role based security used in accessing private data.

FIG. 5 illustrates an example of a user accessing private data in a data record. A user 502, in this example, a user working in an investigative role, sends the tagged record 306 to a record processor 504. The record processor 504 can be, for example, a map operation as described above, or may be a separate component that provides access to the private data.

This record processor 504 identifies the tags in the record. In this example, the record processor 504 detects the <ssn> tag and the <cc> tag. The record processor 504 provides each of the tags, the HMAC, and the security credentials 508 of the user 502 associated each of the tags to a security platform 506.

The security platform sends the security credentials 508 of the user 504 to an authorization engine 510. The authorization engine identifies the user 504 based on the credentials 508 and determines which encryption keys the user can access. The authorization engine 510 provides the cryptographic keys 512 which the user 502 has the authority to use to the security platform 506.

In some implementations, the security platform 506 requests the specific key necessary to decrypt the data identified by the tags. The authorization engine 510 determines if the user 502 has the necessary permissions to access the requested keys and provides the requested keys that the user has permission to use.

The security platform 506 and authorization engine 510, alone of in conjunction, may log requests to access the private information, the cryptographic keys, or both. The logs may be used for later auditing and analysis.

The security platform 506 uses the tags to identify which data store contains the relevant data. The security platform 506 uses the HMAC to identify the data record that includes the relevant data. Then the security platform 506 decrypts the encrypted data using the provided cryptographic keys 512. The security platform 506 provides the decrypted data to the record processor 504. The record processor 504 replaces the tags with the values provided by the security platform 506 to produce the output data record 514 to the user 502.

Figure 6:
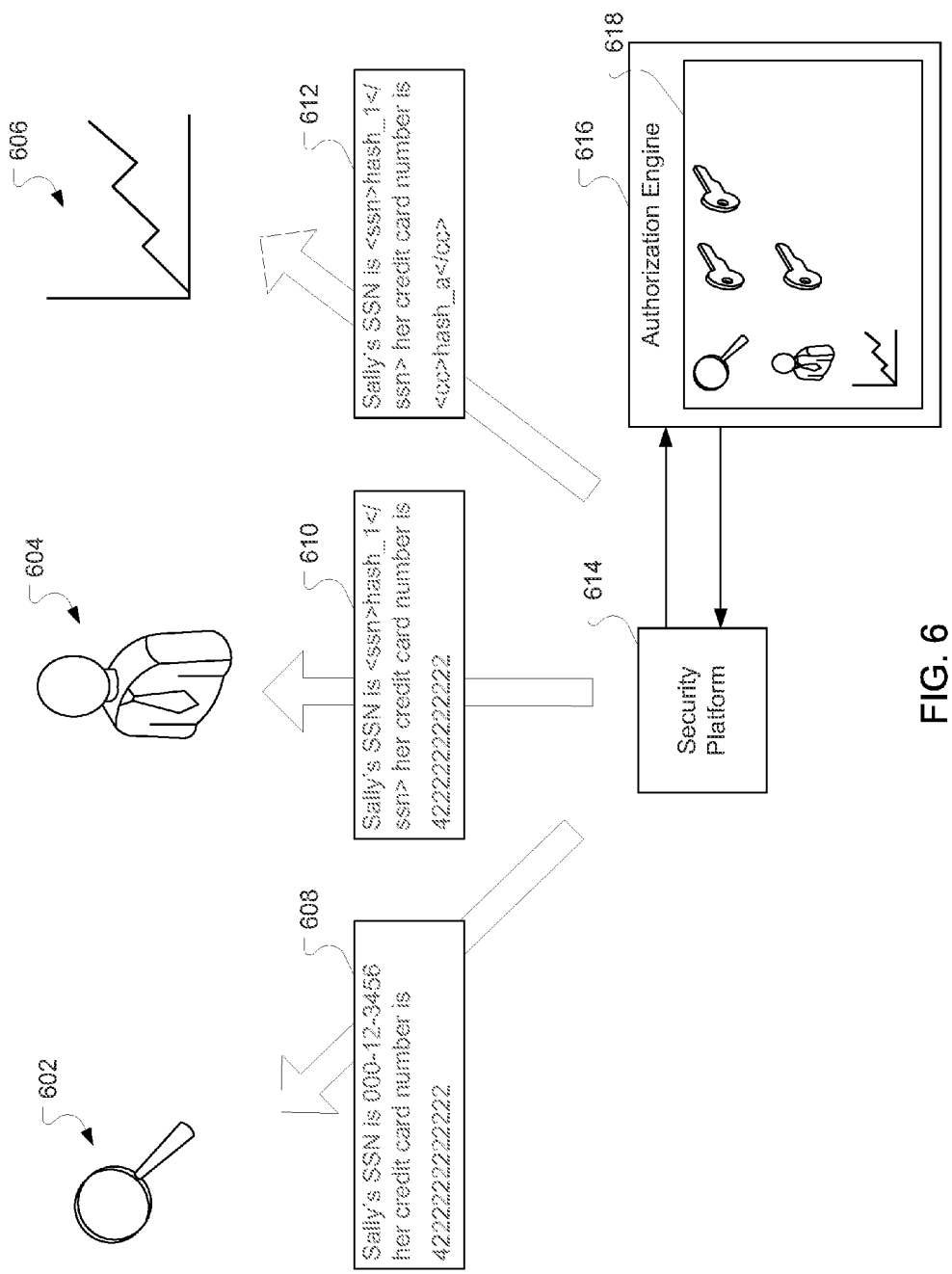

Referring to FIG. 6, as described above the investigative user 602 may have access to all of the private information, for example, the social security number and the credit card number and therefore receives a data record 608 without any private data masked. A business user 604 may have access to the credit card number but not the social security number and therefore receives a data record 610 with the credit card numbered displayed and not the social security number. In this example, the social security number remains obfuscated using the <ssn> hash tag and MAC. A marketing user 606 may not have access to either the social security number or the credit card number, but may have access other private information (not shown) such as demographic information. As such, the marketing user may receive a data record 612 where neither the social security number nor the credit card number are displayed.

In order to support individualized and role based security a security platform 614 can interact with an authorization engine 616. The authorization engine 616 may be a process or subroutine executed within the security platform 614 or may be a separate process or product. The authorization engine 616 stores a mapping 618 between users or types of users and the different cryptographic keys to which the user has access. In this example, the investigative user has access to two keys (credit card number and social security number), the business user has access to one key (credit card number) and the marketing user has access to none of the keys.

Figure 7:
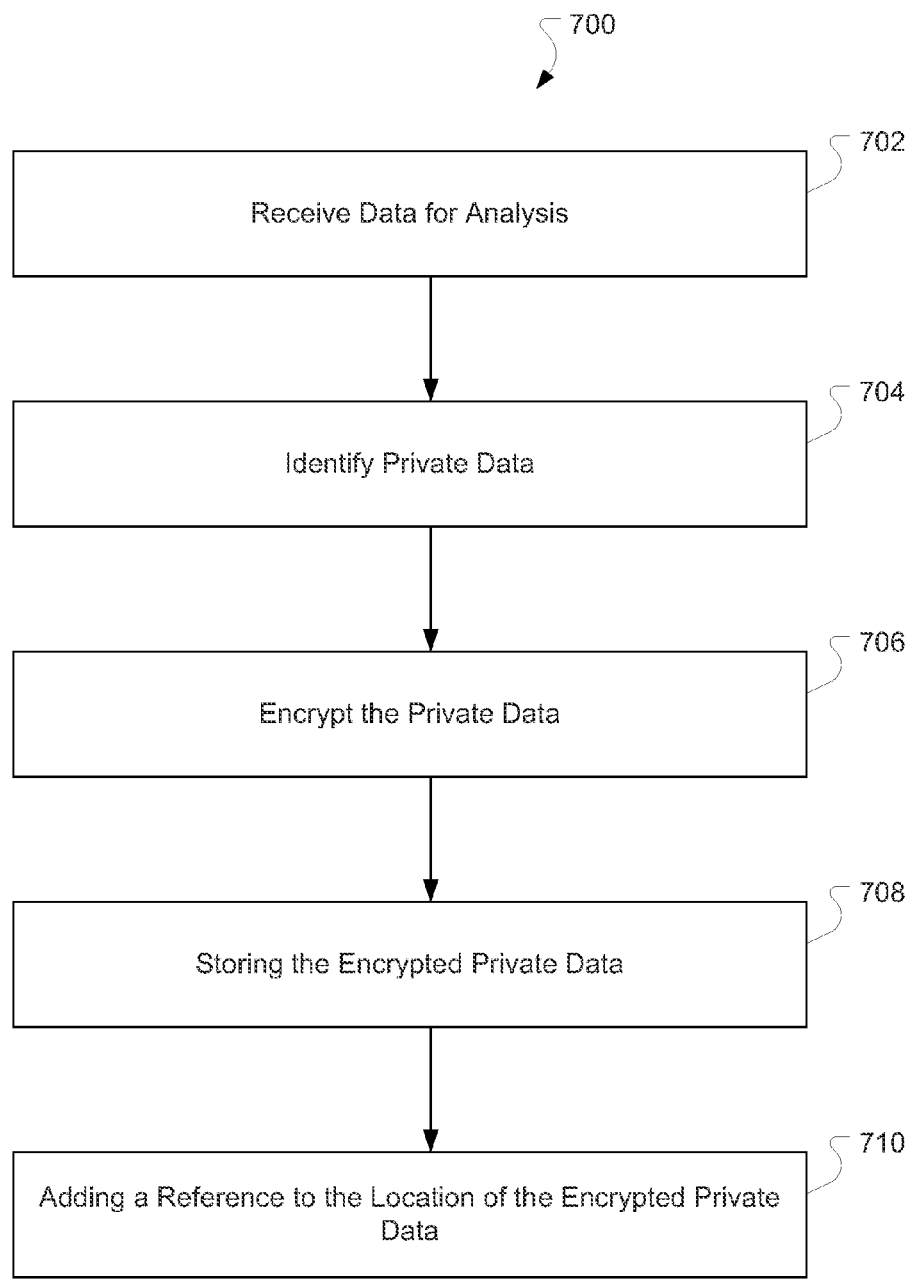
FIG. 7 is a flow chart of an exemplary process for securing data.

FIG. 7 illustrates a flow chart of a process 700 for securing data. The process 700 may be performed by, for example, a map reduce framework including one or more computing systems performing the method.

The process 700 includes receiving 704 data for analysis. The data may be received by a map reduce framework. The data may divided into chunks, each chunk operated on my one or more map reduce nodes.

The process 700 includes identifying 704 private data in received data. The private data may be identified by nodes in a map reduce framework. A map operation performed by the node may search the data by performing one or more a regular expression against the data. Matching data may be subsequently analyzed to reduce the possibility of a false positive.

The process 700 includes encrypting 706 the private data. The private data may be encrypted using a convention encryption method, including but not limited to public key encryption or symmetric key encryption.

The process includes storing 708 the encrypted data in a location that is separate from the received data. For example, the process may extract the private data, encrypt the private data using a symmetric cryptographic key, and store the encrypted data into a data store.

The process includes adding 710 a reference to the location of the encrypted private data in the received data. The location of the encrypted private data may replace the private data in the received data.

Figure 8:
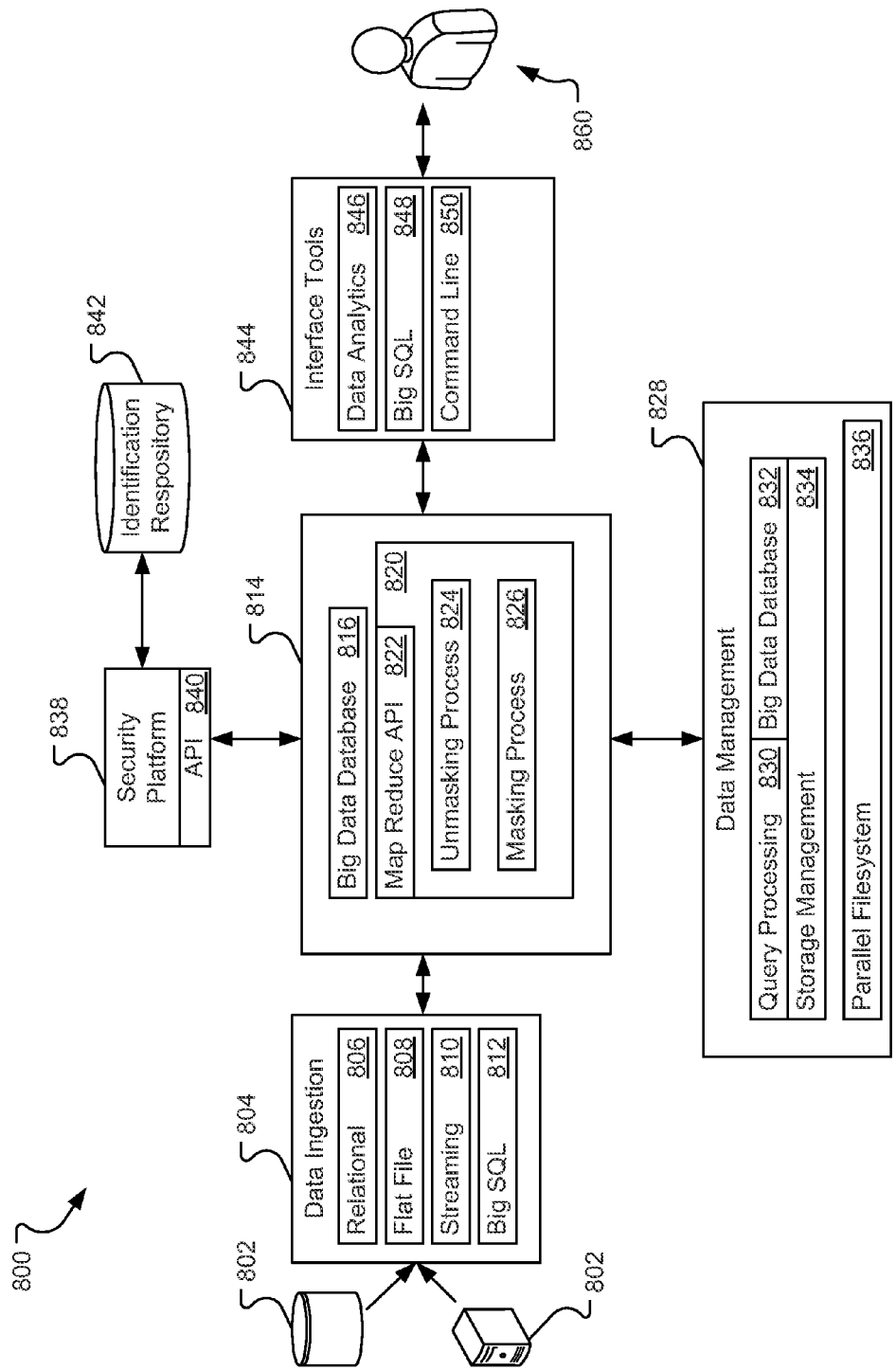
FIG. 8 illustrates an example system 800 for securing data.

FIG. 8 illustrates an example environment 800 for securing data. Data sources 802 can provide data to a big data security component 814. The data can be divided into chunks of data by data ingestion components 804. For example, a relational data ingestion component 806 may read and process data from a relational database, for example, an ORACLE database. A flat file data ingestion component 808 may read data from data files stored in a plain text or binary file. Flat files may be either plain text or binary. Plain text files usually contain one record per line. There are different conventions for depicting data. In comma-separated values and delimiter-separated values files, fields can be separated by delimiters such as comma or tab characters. In other cases, each field may have a fixed length; short values may be padded with space characters. A streaming ingestion component 810 may accept data that is provided to a port or other listener which is configured to receive data. In general, a streaming ingestion component 810 receives data which is pushed from a data source. A big SQL ingestion component 812 receives data from a map reduce based framework. For example, BigSQL is IDM's SQL interface to a HADOOP-based platform.

The dig data security system 814 may include a big data database designed to provide random read/write access to large tables, for example, the HBASE by APACHE. Data may be processed by an API 822 for a map reduce framework 820 as described above. During mapping procedure may include a unmasking process 824, which replaces tagged and obfuscated data with the private data, and an masking process 826, which replaces sensitive data with tagged and obfuscated data, as discussed above.

Encryption and authorization services may be provided by accessing an API 840 of a security platform 838. An example of a security platform includes SAFENET.

The security platform may authorize users by accessing an identification repository 842 such as the WINDOW'S ACTIVE DIRECTORY service or a light-weight directory access protocol (LDAP) directory. The identification repository may be a hierarchical distributed database that stores user information, including access permissions.

Encrypted data may be stored and accessed from a storage system 828. The storage system may include a big data database, such as HBASE. A query processing component 830 facilitates querying and managing large datasets residing in distributed storage, for example, the big data database 832. Queries may be managed by a query processing component 830, an example of a query processing component is the APACHE HIVE data warehouse software. A storage management component 834 may provide processing tools can be used to manage the encrypted data. The storage management component 834 may provide a table abstraction which provides users with a relational view of data in the parallel file system. An example of a storage management component 834 is APACHE HCATALOG.

The encrypted data may be stored, ultimately, on a parallel file system 836. The parallel file system maybe a clustered filed system such as IBM's GENERAL PARALLEL FILE SYSTEM (GPFS). The parallel file system 836 may also include optimization tools to enable efficient operation in a "share nothing" architecture. One example of such optimization tools includes the GPFS File Placement Optimizer (GPFS-FPO).

A user 860 may be provided access to the big data security component using interface tools 844. These interface tools can be configured to operate with data analytic software 846, such as BIGINSIGHTS and DATAMEER. The interface tools 844 may also include a BigSQL interface 848 and a command line interface 850.

Figure 9:
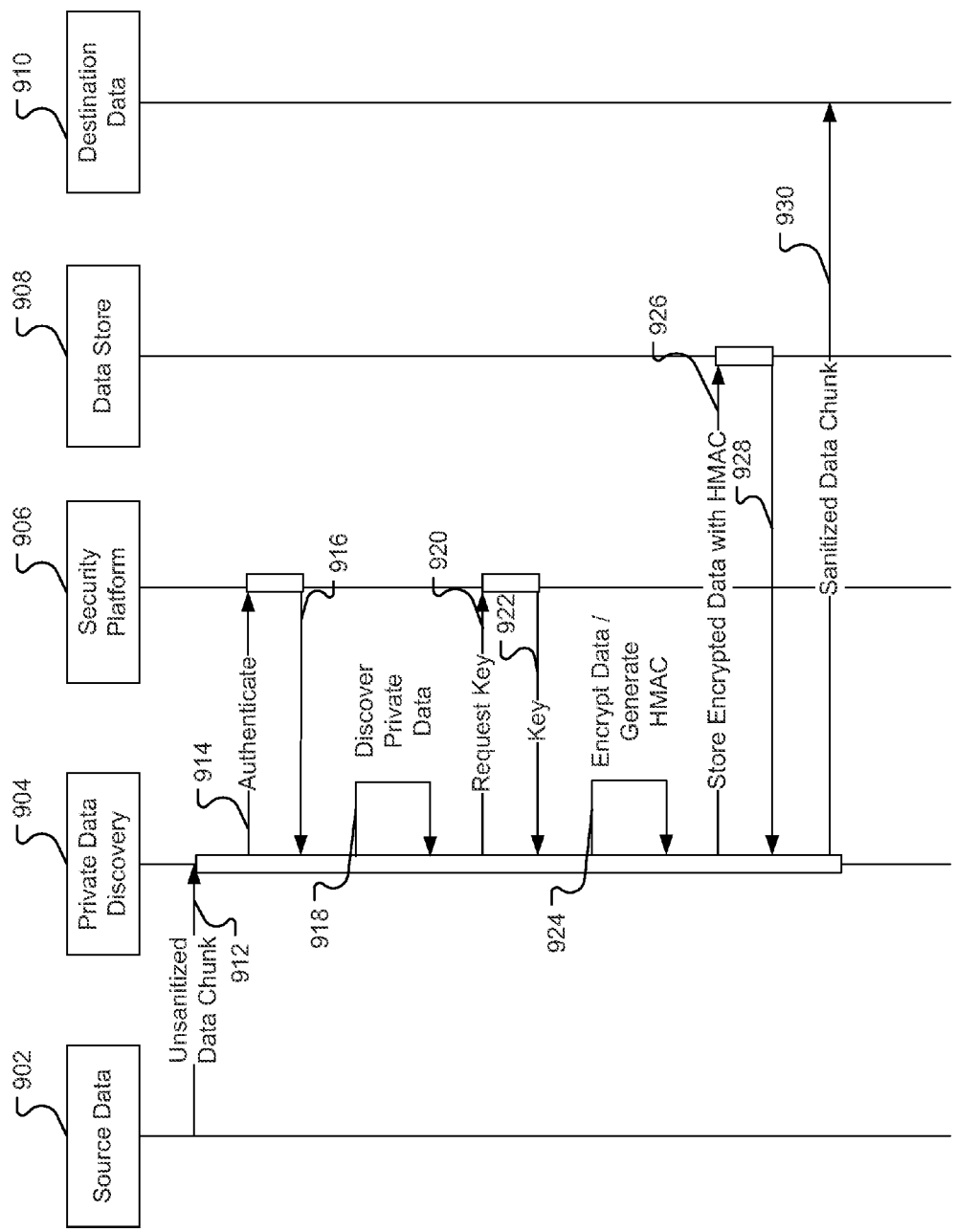
FIG. 9 is a sequence diagram of an exemplary process for encrypting private data.

FIG. 9 is a sequence diagram illustrating an exemplary process for encrypting private data An unsanitized chunk of data is provided 912 to the private data discovery component 904 by the source data 902. In general, an unsanitized chunk of data is a chunk of data in which private data has not been identified and encrypted. For example, a data file that includes plain text credit card numbers.

The private data discovery component 904 authenticates 914 with the security platform 906. The private data discovery component 904 may receive an acknowledgement 916 from the security platform 906.

The private data discovery platform 904 discovers private data 918. The private data may be discovered using a regular expression and validation function, as described above.

The private data discovery component 904 requests 920 a cryptographic key from the security platform 906. As part of the data discovery, the private data discovery component 904 may identify the type of private data. The requested security key may correspond to the type of the private data.

The security platform 906 provides the cryptographic key to the private data discovery component 904.

The private data discovery component 904 encrypt the private data 924 and generates a HMAC, as described above.

The private data discovery component 904 stores the encrypted private data with the HMAC 926 in a data store 908. The private data discovery component 904 adds a reference to the location of the encrypted private data into the data chunk, replacing the private data with the location of the encrypted private data. In some implementations, the replacing the private data with the location of the encrypted data includes adding a token (such as an XML tag) to the data that includes the HMAC of the private data.

The private data discovery component provides the sanitized data chunk 930 to the destination data 910.

Figure 10:
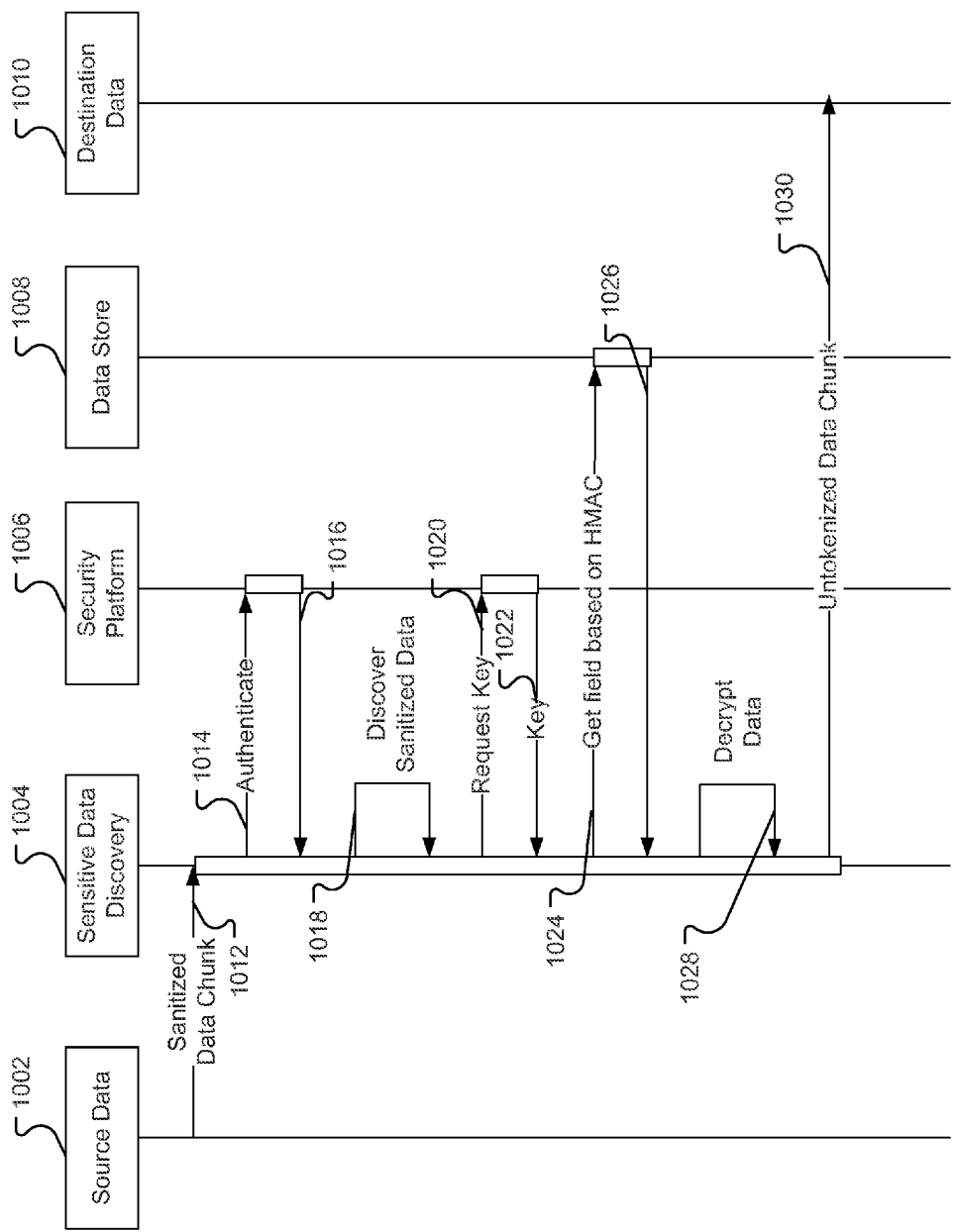
FIG. 10 is a sequence diagram of an exemplary process for decrypting private data.

FIG. 10 is a sequence diagram illustrating an exemplary process for decrypting private data. A sanitized chunk of data is provided 1012 to the private data discovery component 1004 by the source data 9100202. In general, the sanitized chunk of data is a chunk of data in which private data has been identified and encrypted, for example, using the process described above with respect to FIG. 9.

The private data discovery component 1004 authenticates 1014 with the security platform 1006. The private data discovery component 1014 may receive an acknowledgement 1016 from the security platform 1006.

The private data discovery platform 1018 discovers the sanitized data 1018. For example, the private data discovery platform 1018 may discovery the sanitized data by analyzing the sanitized data chunk for tokens.

The private data discovery component 1014 requests 1020 a cryptographic key from the security platform 1006. As part of the data discovery, the private data discovery component 1004 may have identified the type of private data. The requested security key may correspond to the type of the private data.

The security platform 1006 provides the cryptographic key to the private data discovery component 1004.

The private data discovery component 1004 obtains 1024 the encrypted private data from the data store 1008. The private data discovery component 1004 may provide the HMAC to the data store 1008 which can be used to identify the location of the encrypted private data.

The private data discovery component 1004 decrypts the private data 1024. The private data discovery component 1004 can replace the identified tag with the decrypted data.

The private data discovery component 1004 provides the untokenized data chunk 1030 to the destination data 1010.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A computer implemented method for identifying and obfuscating private data in a map-reduce framework, the method comprising:
   receiving, by the map-reduce framework, data for analysis;
   identifying, by the map-reduce framework, the private data in the received data;
   identifying a type of the private data;
   selecting an encryption key based on the type of the private data;
   encrypting the private data using the selected encryption key;
   storing the encrypted private data in a location separate from the received data; and
   obfuscating the private data by adding, to the received data, a reference to the location of the encrypted private data.

2. The method of claim 1, wherein identifying the private data comprises:
   using a regular expression to identify candidate private data; and
   confirming the candidate private data by performing a secondary validation of the candidate private data;
   wherein identifying the type of the private data is based, at least in part, on the regular expression.

3. The method of claim 1, further comprising:
   generating a hash-based message authentication code using the private data.

4. The method of claim 3, wherein adding the reference to the location of the encrypted private data comprises:
   generating a tag, the tag including an indicator of the type of the private data and the hash-based message authentication code; and
   replacing the private data in the received data with the tag.

5. The method of claim 1 further comprising:
   receiving, from a user, a request for decrypted private data, the request including the reference;
   verifying that the user is authorized to obtain the decrypted private data;
   obtaining the encrypted private data based on the reference;
   obtaining the decrypted private data by decrypting the encrypted private data; and
   providing the decrypted private data to the user.

6. The method of claim 1, further comprising:
   receiving, from a user, sanitized data, the sanitized data including a plurality of references to corresponding private data;
   for each reference in the plurality of references, processing the respective reference, the processing comprising:
      obtaining corresponding encrypted private data based on the respective reference;
      verifying that the user is authorized to obtain corresponding decrypted private data; and
      in response to determining the user is authorized, obtaining the corresponding decrypted private data by decrypting the corresponding encrypted private data and updating the sanitized data to include the corresponding decrypted private data.

7. The method of claim 6, wherein the user is authorized to obtain the corresponding decrypted private data for at least one reference in the plurality of references.

8. A non-transitory computer storage medium encoded with computer program instructions that when executed by one or more computers cause the one or more computers to perform operations comprising:
   receiving, by the map-reduce framework, data for analysis;
   identifying, by the map-reduce framework, the private data in the received data;
   identifying a type of the private data;
   selecting an encryption key based on the type of the private data;
   encrypting the private data using the selected encryption key;
   storing the encrypted private data in a location separate from the received data; and
   obfuscating the private data by adding, to the received data, a reference to the location of the encrypted private data.

9. The medium of claim 8, wherein identifying the private data comprises:
   using a regular expression to identify candidate private data; and
   confirming the candidate private data by performing a secondary validation of the candidate private data;
   wherein identifying the type of the private data is based, at least in part, on the regular expression.

10. The medium of claim 8, wherein the operations further comprise:
   generating a hash-based message authentication code using the private data.

11. The medium of claim 10, wherein adding the reference to the location of the encrypted private data comprises:
   generating a tag, the tag including an indicator of the type of the private data and the hash-based message authentication code; and
   replacing the private data in the received data with the tag.

12. The medium of claim 8, wherein the operations further comprise:
   receiving, from a user, a request for decrypted private data, the request including the reference;

verifying that the user is authorized to obtain the decrypted private data;
obtaining the encrypted private data based on the reference;
obtaining the decrypted private data by decrypting the encrypted private data; and
providing the decrypted private data to the user.

13. The medium of claim 8, wherein the operations further comprise:
receiving, from a user, sanitized data, the sanitized data including a plurality of references to corresponding private data;
for each reference in the plurality of references, processing the respective reference, the processing comprising:
obtaining corresponding encrypted private data based on the respective reference;
verifying that the user is authorized to obtain corresponding decrypted private data; and
in response to determining the user is authorized, obtaining the corresponding decrypted private data by decrypting the corresponding encrypted private data and updating the sanitized data to include the corresponding decrypted private data.

14. The medium of claim 13, wherein the user is authorized to obtain decrypted corresponding private data for at least one reference in the plurality of references.

15. A system comprising:
a data ingestion component configured to receive data for analysis;
a big data security component configured to:
identify the private data in the received data,
identify a type of the private data;
select an encryption key based on the type of the private data;
encrypt the private data using the selected encryption key, and
obfuscate the private data by adding, to the received data, a reference to a location of the encrypted private data; and
a data management component configured to store the encrypted private data in the location separate from the received data.

16. The system of claim 15, wherein identifying the private data comprises:
using a regular expression to identify candidate private data; and
confirming the candidate private data by performing a secondary validation of the candidate private data;
wherein identifying the type of the private data is based, at least in part, on the regular expression.

17. The system of claim 15, wherein the operations further comprise:
generating a hash-based message authentication code using the private data.

18. The system of claim 17, wherein adding the reference to the location of the encrypted private data comprises:
generating a tag, the tag including an indicator of the type of the private data and the hash-based message authentication code; and
replacing the private data in the received data with the tag.

19. The system of claim 15, further comprising:
an interface component configured to:
receive, from a user, a request for decrypted private data, the request including the reference, and
provide the decrypted private data to the user; and
a security platform configured to verify that the user is authorized to obtain the decrypted private data;
wherein the big data security component is further configured to:
obtain the encrypted private data based on the reference, and
obtain the decrypted private data by decrypting the encrypted private data.

20. The system of claim 15, wherein the operations further comprise:
an interface component configured to receive sanitized data from a user, the sanitized data including a plurality of references to corresponding private data;
wherein the big data security component is configured to:
for each reference in the plurality of references, process the respective reference, the processing comprising:
obtain corresponding encrypted private data based on the respective reference;
verify that the user is authorized to obtain the corresponding decrypted private data; and
in response to determining the user is authorized, obtain the corresponding decrypted private data by decrypting the corresponding encrypted private data and updating the data to include the corresponding decrypted private data.

21. The system of claim 20, wherein the user is authorized to obtain the corresponding decrypted private data for at least one reference in the plurality of references.

* * * * *